Dec. 3, 1968     B. R. FRIEDRICH     3,414,204
STATOR WINDING MACHINE
Filed Feb. 9, 1965                                       3 Sheets-Sheet 1

INVENTOR.
BRUNO R. FRIEDRICH
BY
Wheeler, Wheeler & Wheeler
ATTORNEYS.

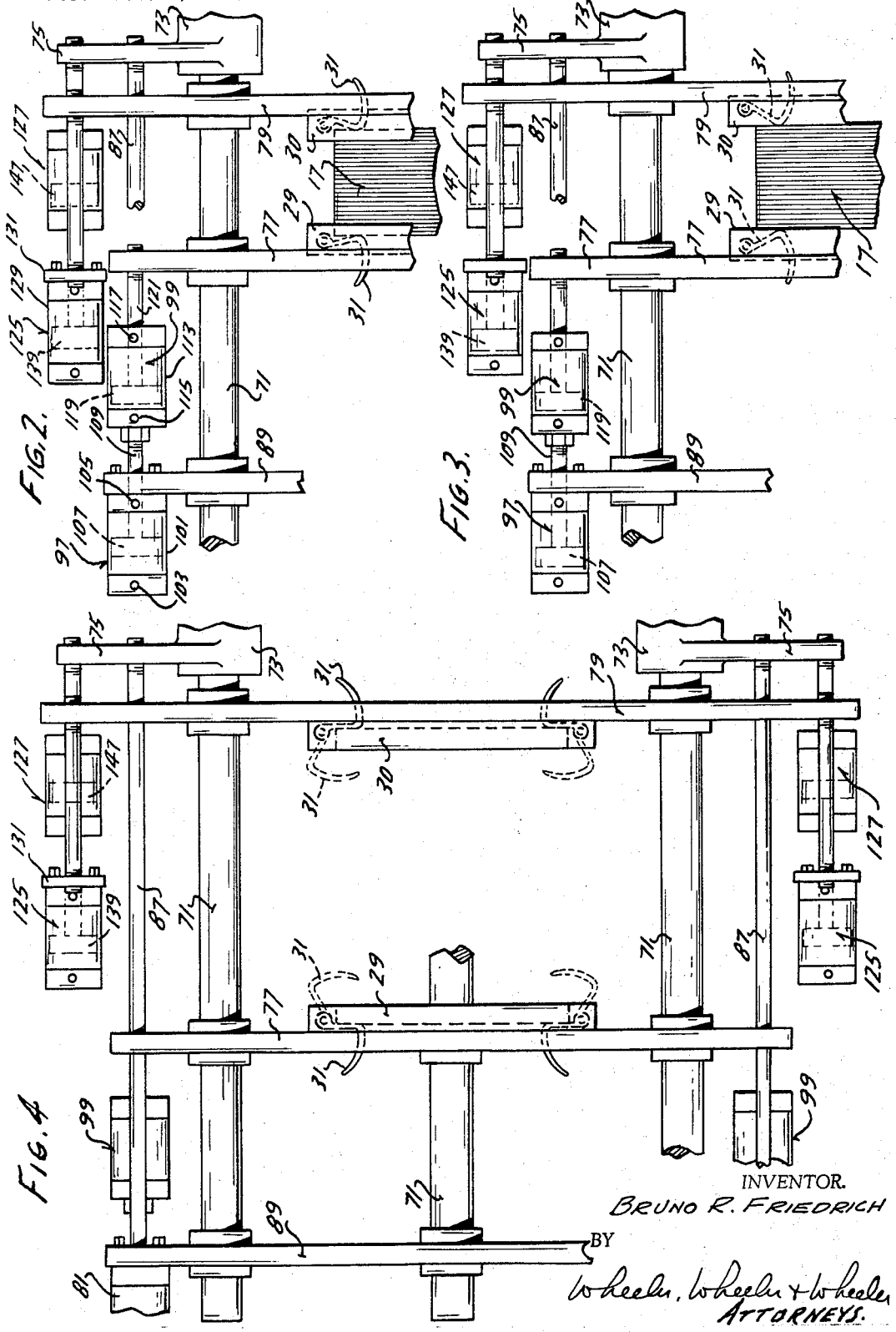

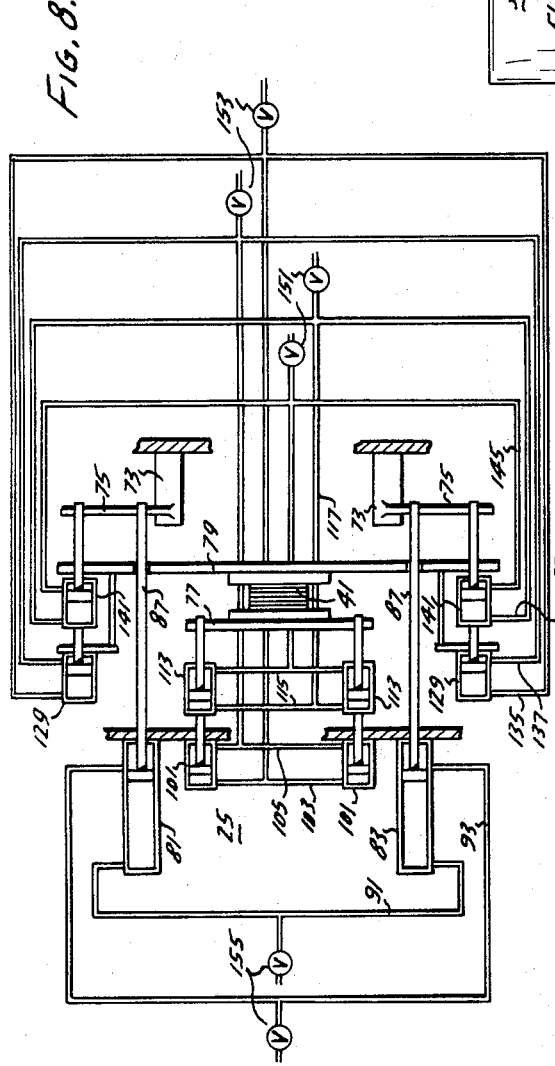

United States Patent Office 3,414,204
Patented Dec. 3, 1968

3,414,204
STATOR WINDING MACHINE
Bruno R. Friedrich, Milwaukee, Wis., assignor to
Henry J. Gorski, Milwaukee, Wis.
Filed Feb. 9, 1965, Ser. No. 431,324
18 Claims. (Cl. 242—1.1)

ABSTRACT OF THE DISCLOSURE

A machine for winding electric motor stators in which hydraulically operated rings engage and support opposite ends of a stator. The rings pivotally carry spring-biased fingers which support a first coil being wound onto the stator after which the rings are moved apart to a second position allowing the fingers to receive a second coil at predetermined positions, followed by separation of the rings to a third position where the wound stator is free of the rings.

---

The invention relates to stator winding machines and to tooling arrangements associated with such machines, as for instance, with the machine disclosed in the Gorski et al. Patent No. 3,052,418.

The invention provides a tool attachment which affords winding of multiple coil layers located at differing radial distances from a stator bore without requiring stator removal or relocation with respect to the attachment, and without requiring tooling changes. The invention employs a pair of stator supporting tooling rings which include counter bores receiving the stator to be wound. Each of the tooling rings includes a series of pivotally mounted, hook shaped fingers which, during the winding operation, are located adjacent the end faces of the stator being wound, and serve to retain the wire coils clear of the stator bore during the winding operation. The pivotal mounting of such fingers and their hook shape affords removal thereof from the wound stator by reason of finger passage between the coils and the stator in response to tooling ring movement axially away from the stator to afford removal of the stator from the tooling rings.

The invention resides in the realization and utilization of the fact that movement of the tooling rings axially away from the stator initially affords progressively radially inward disposition of the wire-retaining bite of the hook shaped fingers. In addition, the invention resides in the provision of means for biasing the fingers to maintain finger engagement with the stator so long as the stator is retained in the counter bores of the tooling rings, and in the provision of an arrangement for selectively displacing the tooling rings relative to two or more differently spaced stator holding positions.

The invention also resides in the utilization of stator supporting counter bores of sufficient depth to afford selective separation of the tooling rings through distances which afford retention of the stator in the counter bores while also affording retention of finger engagement with the stator and consequent location of the wire-retaining bite at a lesser radial distance from the stator axis, thereby facilitating the winding of progressively inwardly located coil layers.

Still further, the invention resides in means for maintaining the stator centered with respect to the tooling rings and the reciprocating stroke of the winding head notwithstanding separation of the stator tooling rings, so as to make unnecessary adjustment to the winding head stroke. Other objects and advantages of the invention will become known by reference to the following description and the accompanying drawings in which:

FIGURE 2 is a fragmentary view of a portion of the tooling attachment shown in FIGURE 1 and is illustrative of a stator holding position in which the tooling rings are more widely separated than in FIGURE 1;

FIGURE 3 is a fragmentary view similar to FIGURE 2 and is illustrative of a stator holding position in which the tooling rings are more widely spaced than in FIGURE 2;

FIGURE 4 is a fragmentary view along the lines of FIGURES 1, 2 and 3 and illustrative of the open position of the tooling rings affording stator removal and showing, in dotted outline, a transitory position of the fingers 31;

FIGURE 5 is a fragmentary view taken generally along line 5—5 of FIGURE 1;

FIGURE 6 is a fragmentary view partially broken away and taken along line 6—6 of FIGURE 1;

FIGURE 7 is an enlarged view of the various positions of engagement of the stator with one of the tooling rings; and FIGURE 8 is a schematic view of the fluid actuator arrangement for operating the tool attachment shown in FIGURE 1.

Figure 1:
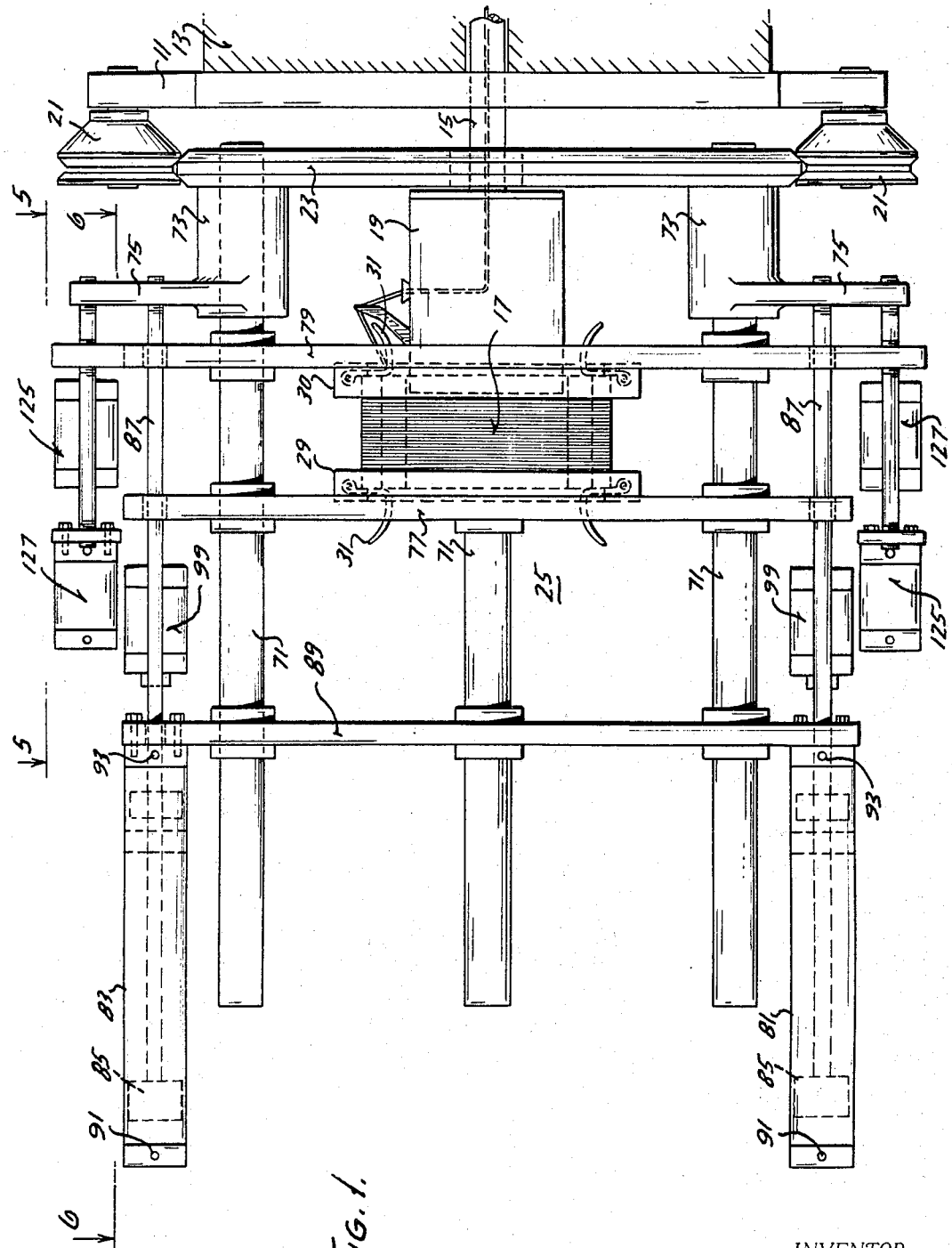
FIGURE 1 is an elevational view of a tooling attachment which embodies various of the features of the invention and which is shown in its stator holding position.

Shown in FIGURE 1 is the mounting plate 11 of a coil winding machine 13 such as disclosed in the Gorski et al. Patent No. 3,052,418, issued Sept. 4, 1962. The winding machine 13 includes a shuttle 15 which is reciprocable and oscillatable relative to the machine 13 and to a stator 17 which is supported by means still to be described. Carried on the shuttle 15 is a winding head 19 which can be constructed as disclosed in copending application Ser. No. 445,010, filed Apr. 2, 1965, now Patent No. 3,323,734.

Supported by the mounting plate 11 are a plurality of grooved rollers 21 which rotatably support a circular plate 23. Various means, not a part of the present invention, can be employed to rotate the plate as desired to angularly shift the coil winding operation. Carried by the circular plate 23 is a tooling attachment 25 which is constructed in accordance with the invention, which is designed to support the stator 17 for winding operation, and which affords winding of a plurality of coil layers 27 (see FIG. 7) without removal or relocation of the stator or changing of the tooling.

The attachment comprises a pair of stator holding tooling rings or members 29 and 30, each including a series of pivotally mounted wire guiding or coil retaining fingers 31, means for supporting the pair of stator holding tooling rings, and means affording winding of two or more radially spaced coil layers 27 without stator relocation or tooling change. In the disclosed construction, such means includes means for pivotally mounting the coil retaining or wire guiding fingers 31, means biasing said fingers 31 toward a stator retained by the tooling rings 29 and 30, and means for selectively separating, spacing, locating, or displacing the tooling rings while continuing support of the stator so as to afford incremental radially inward movement of the wire guiding bite of the fingers 31. In this regard, each increment of radially inward movement of the wire guiding bite of the fingers 31 affords the winding of another inner coil layer.

For purposes of the invention herein disclosed, the tooling rings 29 and 30 are generally identical except for being left and right handed and each include means for supporting a stator to be wound. While various arrangements can be employed, in the disclosed construction, each of the tooling rings 29 and 30 is centrally apertured at 33 and counter bored at 35 to provide a generally cylindrical surface 37 which is engageable with portions of the outer circular periphery of the stator 17 to support the stator in coaxial relation with the winding head 17. The stator supporting surfaces 37 respectively terminate at respective shoulders 38 which define the depth of the counter bores 35 and which are engageable with the end faces of the stator when the tooling rings 29 are in their fully closed, stator holding positions.

Each of the tooling rings 29 and 30 includes a series of radially extending recesses or slots 39 located in accordance with the spacing of the teeth 41 of the stator 17 to be wound. The fingers 31 which serve to retain the windings or coil layers radially outwardly of the stator bore during the winding operation are respectively mounted in the slots 39. Each finger 31 generally includes (see FIGURE 7) a base 43, a more or less straight portion 45 extending from the base 43, and a curved outer portion 47 which merges with the straight portion 45, which imparts a hooked shape to the finger 31 and which, in cooperation with the straight portion, defines a wire retaining bite 49. At their bases 43, the fingers are mounted by suitable means in the form of pivots 51.

The means biasing the fingers 31 toward the stator 17 operates to pivot the fingers through the apertures 33 in the direction of the end faces 36 to positions extending generally inwardly of the apertures as shown in the dotted outline identified by numeral 53 in FIGURE 7. While various arrangements can be employed, in the disclosed construction, such means comprises a separate leaf spring 55 associated with each finger 31. As shown best in FIGURE 7, each spring 55 is anchored by suitable means such as one or more rivets or bolts 57 to an anchoring portion 59 of the ring 29. Desirably, the anchoring portion 59 is chamfered or relieved as shown at 61 to accommodate the spring 45 when the associated finger 31 is located with its bite 49 in its radially outermost position, as shown in full lines in FIGURE 7.

In FIGURE 7, the spring 55 serves to bias the finger for rotation in the clockwise direction. Desirably, the springs 55 are fabricated so that the extent of the bias exerted thereby diminishes rapidly to zero beyond a condition or position wherein the associated fingers extend radially inwardly of the ring aperture and are engaged with the stator 17 when the tooling rings 29 and 30 are at their maximum separation which is still capable of supporting the stator by reason of receipt of the stator in the counter bores 35.

Desirably, additional means are provided for biasing the fingers 31 in a direction counter to the direction of bias of the spring 55 so as to releasably retain the fingers 31 adjacent the springs 55 when the fingers 31 are not operatively biased by the springs 55 and when the fingers 31 are not prevented from assuming a position in engagement with the springs 55. For example, it is noted that the fingers 31 are prevented from engaging the springs 55 during withdrawal of the fingers 31 from between the stator 17 and the coil layers 27 wound thereon during tooling ring separation affording stator removal. While various arrangements can be employed, in the disclosed construction, each finger has associated therewith a relatively light coil spring 63 which is anchored at one end to the tooling ring 29 and at the other end to the finger base 43 and which is fabricated or prestressed so as to bias the finger 31 in the counterclockwise direction as shown in FIGURE 7. The springs 63 are less strong than the springs 55. Therefore, the springs 63 do not adversely effect operation of the springs 55, and are overpowered by the springs 55 whenever the fingers are located beyond the position or condition referred to above.

In addition to retaining the fingers 31 against the stator 17, springs 55 also serve as means for retaining the stator in centered position axially of head movement with respect to the tooling rings 29 and 30 and in some instances with respect to the reciprocating movement or stroke of the winding head 19 when the tooling rings 30 are located at a spacing in excess of the distance therebetween when in the fully closed stator holding positions. As the springs 55 of each tooling ring 29 and 30 are generally of the same strength, they will therefore act to afford retention of the stator 17 in centered relation to the tooling rings 29 and 30 so long as the stator is supported by the counterbores 35.

Also in accordance with the invention, the tooling ring counterbores 35 are designed with a depth sufficient to afford retention of the stator 17 when the tooling rings 29 and 30 are located in the maximum separation intended to afford stator support and to facilitate winding operation.

The means for supporting the pair of stator holding, tooling rings 29 and 30 includes a plurality of fixed support rods 71 extending in the direction of reciprocating winding head movement, there in the disclosed construction, together with a pair of collars 73 which, adjacent the circular plate 23, are fixed to two of the support rods 71 and respectively include outwardly extending wings or lugs 75.

Movably mounted on the support rods 71 and forming components of the tooling ring supporting means, are a pair of centrally apertured plates 77 and 79 which support the respective tooling rings 29 and 30.

In accordance with the invention, the plates 77 and 79, and therefore the tooling rings 29 and 30, are selectively separable from first or fully closed stator holding positions wherein the stator 17 is engaged with the surfaces 37 and seated against the shoulders 38, to one or more partially opened, second, stator holding positions wherein the tooling rings 29 and 30 are more widely spaced and the stator 17 is supported by engagement with the surfaces 37, and to a fully opened position which affords stator removal and wherein the surfaces 37 are withdrawn from the stator 17. Various arrangements can be employed to shift the holding plates 77 and 79, and therefore the tooling rings 29 and 30, between their various positions. Only one of the plates can be shifted or both plates can be simultaneously and/or alternatively shifted. In the disclosed construction, only the plate 77, shown to the left in FIGURES 1 through 4, is shifted to space the tooling rings 29 so as to afford stator removal. However, when the plates 77 and 79, and therefore the tooling rings 29 and 30, are shifted between their fully closed, and partially open stator holding positions, both plates 77 and 79, and therefore the tooling rings 29 and 30, are moved approximately simultaneously through approximately the same distances so as to facilitate retention of the stator in generally constant, centered position with respect to the reciprocating stroke of the winding head 19.

While various mechanical or other means can be employed to shift the holding plates 77 and 79, in the disclosed construction, means in the form of a fluid powered or operated arrangement, including two generally identical and simultaneously operated branches, are employed.

More specifically, means in the form of a pair of double acting fluid rams 81, each comprising a cylinder 83, piston 85, and piston rod 87, are employed for shifting the plate 77 to afford stator removal. More specifically, the cylinders 83 are fixed to a bar or block 89 which, in turn, is connected to the plate 77 as will be explained. The piston rods 87 extend through the block 89, and through both stator holding plates 77 and 79, to a fixed connection with the respective lugs 75 on the collars 73. Connected to the opposite ends of the cylinders are respective fluid conduits 91 and 93. In operation, upon the introduction of pressure fluid through the conduits 91 to the left of the pistons 85, the pistons travel to the right relative to the cylinders 83, thereby moving the block 89 and accompanying plate 77 to the left to afford stator removal. Introduction of pressure fluid through the conduits 93 to the right of the pistons 85 causes piston travel to the left relative to the cylinders 83, thereby effecting movement of the block 89 and accompanying movement of the plate 77 toward the other plate 79.

Means in the form of two pair of series connected, double acting fluid rams 97 and 99 are provided for connecting the plate 77 to the block 89, thereby affording simultaneous movement of the block 89 and plate 77 along the rods support 71, and for displacing the plate 77 along the support rods 71 relative to the block 89 and therefore also relative to the other plate 79.

Specifically, there is fixedly mounted on the block 89 (see FIGURE 2) a pair of cylinders 101 communicating at their respective ends with respective fluid conduit 103 and 105 and carrying therein respective pistons 107 each connected to respective piston rods 109. The piston rods extend freely through the block 89 and are respectively fixedly connected to respective cylinders 113, which also communicate at their ends, with respective fluid conduits 115 and 117. Carried in the cylinders are respective pistons 119 connected to piston rods 121 fixed to the plate 77.

In operation, introduction of fluid into the cylinders 101 to the left of the pistons 107 will cause displacement of the piston rods 109, cylinders 113, and plate 77 to the left as shown in FIGURES 1–6. Introduction of pressure fluid into the cylinders 101 to the right of the pistons 107 will cause movement of the piston rods 109 and cylinders 113 to the left in FIGURES 1–6. Likewise, the introduction of pressure fluid to the left of the pistons 119 in the respective cylinders 113 will cause movement of the plate 77 to the right as shown in FIGURES 1–6 and introduction of pressure fluid to the right of the pistons 119 will cause opposite movement of the plate 77.

Means in the form of two pair of series connected double acting fluid rams 125 and 127 are employed to displace the plate 79 along the support rods and relative to the other plate 77. Specifically, a first pair of double acting fluid cylinders 129 are fixed with respect to the plate 79 by reason of being fixed (see FIGURE 5) to brackets 131 supported by studs 133 extending from the plate. Communicating at each of the ends of the cylinders 129 are respective fluid conduits 135 and 137. Carried in each of the cylinders 129 are respective pistons 139 having piston rods 141 which are respectively fixed to fluid cylinders 141 each communicating at the ends thereof with respective fluid conduits 143 and 145. Carried in each of the cylinders 141 are respective pistons 147 which are connected to piston rods 149 extending from the cylinders 141 and fixed to the lugs 75 extending from the collars 73.

In operation, introduction of fluid to the left of the pistons 139 and 147 in each of the cylinders 129 and 141 will cause movement of the plate 79 to the left as shown in FIGURE 5. Likewise, introduction of pressure fluid into either of the cylinders 129 and 141 to the right of the pistons 139 and 147 therein will cause movement of the plate 79 to the left as shown in FIGURE 5.

Suitable valving shown schematically and only fragmentarily is provided for porting each of the ends of the cylinders during introduction of pressure fluids into the opposite cylinder end. The various conduits are selectively communicatable through the valves 151, 153 and 155 with a source of pressure fluid and with a reservoir or sump (not shown). In the case of the use of air as the pressure fluid, the reservoir can comprise the surrounding atmosphere.

As can be seen from FIGURE 8, conduits 103 and 137, 105 and 135, 115 and 145, and 117 and 143 are connected so as to afford simultaneous displacement of the holding plates 77 and 79 during separation from and return to their fully closed stator holding positions.

While the illustrated cylinders are all generally of the same length, variation in the amount of holding plate movement can be obtained by using cylinders of differing lengths. For instance, suppose cylinders 101 and 129 have operating strokes of 3/16 of an inch and cylinders 113 and 141 have operating strokes of 1/4 of an inch. The holding plates 77 and 79 can then be separated, assuming simultaneous cylinder operation, through total distances of 3/8 of an inch by operating cylinders 101 and 129, 1/2 of an inch by operating cylinders 113 and 141, and through 7/8 of an inch by simultaneously operating all cylinders 101, 113, 129 and 141.

In addition, as already noted, if desired, the holding plate displacement arrangement can provide for single step movement of one holding plate through a first distance, say 3/8 inch and single step movement of the other holding plate through a distance of 1/2 inch. Accordingly, separations in the amount of 3/8, 1/2, and 7/8 inch can be obtained by independently or concurrently actuating the cylinders.

In overall operation, a stator is first loaded in the attachment 25 by displacing the plates 77 and 79, and therefore the tooling rings 29 and 30, to their fully closed stator holding positions. The winding head 19 is then actuated to lay a first radially outwardly located series of coils in the stator. Subsequently, either the cylinders 101 and 129 or the cylinders 113 and 141 are simultaneously actuated to separate the holding plates 77 and 79 to a more widely spaced second holding position shown in FIGURE 2. Such spacing of the tooling rings 29 and 30 affords pivotal movement of the fingers 31 to the position indicated by the numeral 54 in FIGURE 7 to afford laying of an inner layer of coils by subsequent operation of the winding head.

Following the placement of the second layer of coils, the other set of cylinders is operated to space the holding plates 77 and 79 and therefore the tooling rings 29 and 30 to a third stator holding position which is shown in FIGURE 3. In this position, the tooling rings 29 and 30 assume the position indicated by the figure 53 in FIGURE 7 and afford placement of a third and innermost radially located coil layer as a result of subsequent operation of the winding head 19. After the third innermost layer of coils has been placed on the stator, the fluid rams 81 are then actuated to separate the holding plate 77 from the plate 79 to afford stator removal. As can be readily seen, the attachment specifically described above affords the winding of three radially located layers of coils without necessitating stator relocation or removal or otherwise affecting the routine or normal operation of the attachment.

Various of the features of the invention are set forth in the following claims.

What is claimed is:

1. An attachment for a stator winding machine, said attachment comprising support means, a pair of members movably mounted on said support means, a plurality of fingers mounted on said members, means for selectively locating said members relative to each other on said support means between spaced, first stator holding positions wherein said fingers are located in first positions to afford winding of a first coil on the stator, second stator holding positions spaced more widely than said first stator holding positions and wherein said fingers are located in second positions different from said first positions to afford winding of a second coil on the stator, and third positions spaced more widely than said second positions, and means on said members affording support of a stator when said members are in said first and second positions.

2. An attachment for a stator winding machine, said attachment comprising support means, a pair of members movably mounted on said support means, a plurality of fingers mounted on said members, means for selectively and simultaneously displacing said members relative to each other on said support means between spaced, first stator holding positions wherein said fingers are located in first positions to afford winding of a first coil on the stator, second stator holding positions spaced more widely than said first stator holding positions and wherein said fingers are located in second positions different from said first positions to afford winding of a second coil on the stator, and third positions spaced more widely than said second positions, and means on said members affording support of a stator when said members are in said first and second positions.

3. An attachment for a stator winding machine, said attachment comprising support means, a pair of members movably mounted on said support means, a plurality of fingers mounted on said members, fluid operating means for simultaneously displacing said members relative to each other through selective common distances on said support means between spaced, first stator holding positions wherein said fingers are located in first positions to afford winding of a first coil on the stator, and second stator holding positions spaced more widely than said first stator holding positions and wherein said fingers are located in second positions different from said first positions to afford winding of a second coil on the stator, and means on said members affording support of a stator when said members are in said first and second positions.

4. An attachment for a stator winding machine, said attachment comprising support means, a pair of members movably mounted on said support means, each of said members having therein an aperture, a plurality of fingers mounted on said members, means for selectively spacing said members relative to each other between spaced, first stator holding positions wherein said fingers are located in first positions to afford winding of a first coil on the stator, second stator holding positions spaced more widely than said first stator holding positions and wherein said fingers are located in second positions different from said first positions to afford winding of a second coil on the stator, and third positions spaced more widely than said second positions, and means on said members defining facing, counter bores generally concentric with said apertures and adapted for receipt and support of a stator to be wound, said counter bores having a combined depth greater than the difference between the spacing of said members when in said first positions and the spacing of said members when in said second positions.

5. An attachment for a stator winding machine, said attachment comprising support means, a pair of annular members, each of said members having a central aperture, means for supporting a stator to be wound, a wire guiding finger having a curved portion defining a wire guiding bite, means mounting said finger for pivotal movement in a plane extending axially and radially of the axis of said aperture and with said bite open in the direction away from one of the member end faces when said finger extends generally radially inwardly of said aperture, first means biasing said finger for pivotal movement through said aperture in the direction toward said one end face to a position extending generally radially inwardly of said aperture, said first biasing means being ineffective to bias said finger in said direction toward said one end face beyond said position, and second means biasing said finger for rotation in the direction opposite to the bias of said first biasing means, said second biasing means being overpowered by said first biasing means when said finger is located beyond said position in the direction counter to the bias of said first biasing means, said members being movably mounted on said support means with said one faces in opposed facing relation, and means for selectively displacing said members relative to each other on said support means between first stator holding positions, second stator holding positions spaced more widely than said first stator holding positions, and third positions spaced more widely than said second positions.

6. An attachment for a stator winding machine, said attachment comprising support means, a pair of annular members, each of said members having a central aperture, a counterbore extending coaxially with the said aperture from one end face of said ring and adapted for receiving and supporting a stator, a plurality of wire guiding fingers each having a curved portion defining a wire guiding bite, means mounting said fingers for pivotal movement in respective planes extending axially and radially of the axis of said aperture and about respective axes transverse to the axis of said aperture and with said respective bites open in the direction away from said one end face when said fingers extend generally radially inwardly of said aperture, first means biasing said fingers for pivotal movement through said aperture in the direction toward said one end face to positions extending generally radially inwardly of said aperture, said first biasing means being ineffective to bias said fingers in said direction toward said one end face beyond said positions, and second means biasing said fingers for rotation in the direction opposite to the bias of said first biasing means, said second biasing means being overpowered by said first biasing means when said fingers are located beyond said positions in the direction counter to the bias of said first biasing means, said members being movably mounted on said support means with said one faces in opposed facing relation, and means for selectively displacing said members relative to each other on said support means between first stator holding positions, second stator holding positions spaced more widely than said first stator holding positions, and third positions spaced more widely than said second positions.

7. An attachment for a stator winding machine, said attachment comprising support means, a pair of members movably mounted on said support means, a plurality of fingers mounted on said members, means for selectively spacing said members relative to each other between spaced, first stator holding positions wherein said fingers are located in first positions to afford winding of a first coil on the stator, second stator holding positions spaced more widely than said first stator holding positions and wherein said fingers are located in second positions different from said first positions to afford winding of a second coil on the stator, and third positions spaced more widely than said second positions, means on said members affording support of a stator when said members are in said first and second positions, and means on said members for locating said stator in centered relation to said members when said members are in said second positions.

8. The combination of a stator winding machine including a linearly reciprocating winding head, support means mounted on said winding machine and extending in the direction of head reciprocation, a pair of members movably mounted on said support means, a plurality of fingers mounted on said members, means for selectively locating said members relative to each other on said support means between spaced, first stator holding positions centered with respect to the stroke of said winding head wherein said fingers are located in first positions to afford winding of a first coil on the stator, second stator holding positions spaced more widely than said first stator holding positions, and third positions spaced more widely than said second positions and wherein said fingers are located in second positions different from said first positions to afford winding of a second coil on the stator, means on said members affording support of a stator when said members are in said first and second positions, and means on said members for locating the stator in centered relation to the stroke of said winding head when said members are in said second positions.

9. The combination of a stator winding machine including a linearly reciprocating winding head, support means mounted on said winding machine and extending in the direction of head reciprocation, a pair of annular members each including a central aperture, means for supporting a stator to be wound, a plurality of wire guiding fingers each having a curved portion defining a wire guiding bite, means mounting said fingers for pivotal movement in respective planes extending axially and radially of the axis of said aperture and with said respective bites open in the direction away from one of the member end faces when said fingers extend generally radially inwardly of said aperture, and means biasing said fingers for pivotal movement through said aperture and in the direction toward said one end face, said members being movably mounted on said support means with said one end faces in facing opposing relation, means for selectively locating said members relative to each other on said support means between spaced, first stator holding positions centered with respect to the stroke of said winding head, second stator holding positions spaced more widely than said first stator holding positions, and third positions spaced more widely than said second positions, and means for locating the stator to be wound in centered relation to the stroke of said winding head when said members are in said second position, said stator locating means including said finger biasing means.

10. The combination of a stator winding machine including a linearly reciprocating winding head, support means mounted on said winding machine an extending in the direction of head reciprocation, a pair of annular members each including a central aperture, means for supporting a stator to be wound, a plurality of wire guiding fingers each having a curved portion refining a wire guiding bite, means mounting said fingers for pivotal movement in respective planes extending axially and radially of the axis of said aperture and with said respective bites open in the direction away from one of the member end faces when said fingers extend generally radially inwardly of said aperture, and means biasing said fingers for pivotal movement through said aperture and in the direction toward said one end face, said members being movably mounted on said support means with said one end faces in facing opposing relation, fluid operated means for simultaneously displacing said members relative to each other through selective common distances on said support means between spaced, first stator holding positions centered with respect to the stroke of said winding head, and second stator holding positions spaced more widely than said first stator holding positions, and means for locating the stator to be wound in centered relation to the stroke of said winding head when said members are in said second position, said stator locating means including said finger biasing means.

11. The combination of a stator winding machine including a linearly reciprocating winding head, support means mounted on said winding machine and extending in the direction of head reciprocation, a pair of annular members each including a central aperture, a counterbore extending coaxially with said aperture from one end face of said member, said apertures being adapted to receive and support a stator to be wound, a plurality of wire guiding fingers each having a curved portion defining a wire guiding bite, means mounting said fingers for pivotal movement in respective planes extending axially and radially of the axis of said aperture and about an axis transverse to the axis of said aperture and with said respective bites open in the direction away from said one end face when said fingers extend generally radially inwardly of said aperture, first means biasing said fingers for pivotal movement through said aperture in the direction toward said one end face to positions extending generally radially inwardly of said aperture, said first biasing means being ineffective to bias said fingers in said direction toward said one end face beyond said respective positions, and second means biasing said fingers for rotation in the direction opposite to the bias of said first biasing means, said second biasing means being overpowered by said first biasing means when said fingers are located beyond said positions in the direction counter to the bias of said first biasing means, said members being movably mounted on said support means with said one end faces in facing opposing relation, fluid operating means for simultaneously displacing said members relative to each other through selective common distances on said support means between spaced, first stator holding positions centered with respect to the stroke of said winding head, and second stator holding positions spaced more widely than said first stator holding positions, the difference between the spacing of said members when in said first positions and the spacing of said members when in said second positions being less than twice the depth of said counterbores, and means for locating the stator to be wound in centered relation to the stroke of said winding head when said members are in said second positions, said stator locating means including said finger biasing means.

12. A tooling ring for use in stator winding, said ring comprising an annular member having a central aperture, a wire guiding finger having a curved portion defining a wire guiding bite, means mounting said finger for pivotal movement about an axis transverse to the axis of said aperture, and means biasing said finger for pivotal movement through said aperture to a position with said bite located generally radially inwardly of said aperture, said biasing means being ineffective to bias said finger in the direction of bias beyond said position.

13. A tooling ring for use in stator winding, said ring comprising an annular member having a central aperture, a wire guiding finger having a curved portion defining a wire guiding bite, means mounting said finger for pivotal movement in a plane extending axially and radially of the axis of said aperture, first means biasing said finger for pivotal movement through said aperture to a position with said bite located generally radially inwardly of said aperture, said first biasing means being ineffective to bias said finger in the direction of the bias of said first biasing means beyond said position, and second means biasing said finger for rotation in the direction opposite to the direction of bias of said first biasing means, said second biasing means being overpowered by said first biasing means when said finger is located beyond said position in the direction counter to the bias of said first biasing means.

14. A tooling ring for use in stator winding, said ring comprising an annular member having a central aperture, a counterbore extending coaxially with said aperture from one end face of said ring, a wire guiding finger having a curved portion defining a wire guiding bite, means mounting said finger for pivotal movement in a plane extending axially and radially of the axis of said aperture and about an axis transverse to the axis of said aperture, first means biasing said finger for pivotal movement through said aperture to a position with said bite located generally radially inwardly of said aperture, said first biasing means being ineffective to bias said finger in direction of the bias of said first biasing means beyond said position, and second means biasing said finger for rotation in the direction opposite to the direction of bias of said first biasing means, said second biasing means being overpowered by said first biasing means when said finger is located beyond said position in the direction counter to the bias of said first biasing means.

15. An attachment for a stator winding machine comprising a pair of members, a plurality of wire guiding fingers, means pivotally mounting said fingers on said members, means for mounting said members on the machine in spaced opposing relation to each other, means biasing said fingers toward the opposing one of said members, and means for selectively displacing said members relative to each other between first positions affording winding of a first coil on the stator, second positions wherein said members are more remote from each other than when in said first positions and affording winding of a second coil on the stator, and third positions wherein said members are more remote from each other than when in said second positions.

16. An attachment for a stator winding machine comprising a pair of members, a plurality of wire guiding fingers, means pivotally mounting said fingers on said members, means for mounting said members on the machine in spaced opposing relation to each other on opposite sides of a stator to be wound, means biasing said fingers toward the opposing one of said members, and means for selectively displacing said members relative to each other and to the intermediate stator between first positions wherein said fingers are biased toward positions of engagement with the stator to locate said fingers in a first angular relationship with respect to said members, second positions wherein said members are more remote from each other and from the stator than when in said first positions and wherein said fingers are biased toward positions of engagement with the stator to locate said fingers in a second angular relationship with respect to said members, and third positions wherein said members are more remote from each other and from the stator than when in said second positions wherein said fingers are located so as to be clear of engagement with the stator.

17. An attachment for a stator winding machine comprising an annular member, a plurality of wire guiding fingers, means pivotally mounting said fingers on said member, means for mounting said member on the machine for movement axially of said member relative to a stator supported by the machine, means biasing said fingers in a direction through the aperture in said member toward the stator, and means for selectively displacing said member relative to the stator between a first position affording winding of a first coil on the stator, a second position wherein said member is more remote from the stator than when in said first position and affording winding of a second coil on the stator, and a third position wherein said member is more remote from the stator than in said second position.

18. An attachment for a stator winding machine comprising a member, a plurality of wire guiding fingers, means pivotally mounting said fingers on said member, means for mounting said member on the machine for movement relative to and axially of a stator supported by the machine, means biasing said fingers in a direction toward the stator, and means for selectively displacing said member relative to the stator between a first position affording winding of a first coil on the stator, a second position wherein said member is more remote from the stator than when in said first position and affording winding of a second coil on the stator, and a third position wherein said member is more remote from the stator than in said second position.

References Cited
UNITED STATES PATENTS

| | | | |
|---|---|---|---|
| 2,953,309 | 9/1960 | Moore | 242—1.1 |
| 2,967,672 | 1/1961 | Zwayer | 242—1.1 |
| 3,072,349 | 1/1963 | Busch et al. | 242—1.1 |

FOREIGN PATENTS

| | | |
|---|---|---|
| 862,555 | 3/1961 | Great Britain. |
| 347,570 | 8/1960 | Switzerland. |

BILLY S. TAYLOR, *Primary Examiner.*